United States Patent [19]

Nagai et al.

[11] Patent Number: 6,014,766
[45] Date of Patent: Jan. 11, 2000

[54] DIGITAL SIGNAL REPRODUCTION APPARATUS

[75] Inventors: Yutaka Nagai; Shuichi Sagano, both of Yokohama; Yoshifumi Takeuchi, Tokyo; Taku Hoshizawa, Fujisawa; Osamu Kawamae, Yokohama, all of Japan

[73] Assignee: Hitachi, Ltd., Tokyo, Japan

[21] Appl. No.: 09/253,616

[22] Filed: Feb. 19, 1999

Related U.S. Application Data

[63] Continuation of application No. 09/008,906, Jan. 16, 1998, Pat. No. 5,920,579.

[30] Foreign Application Priority Data

Jan. 20, 1997 [JP] Japan ................................. 9-007780

[51] Int. Cl.[7] .......................... G11C 29/00; H03M 13/00
[52] U.S. Cl. .......................... 714/764; 714/758; 714/770
[58] Field of Search .................................. 714/764, 763, 714/758, 754, 752, 753, 701, 769, 770, 771, 799, 800, 54

[56] References Cited

U.S. PATENT DOCUMENTS

| | | | |
|---|---|---|---|
| 4,653,051 | 3/1987 | Sugimara et al. | 714/769 |
| 4,680,764 | 7/1987 | Suzuki et al. | 714/756 |
| 4,750,178 | 6/1988 | Sako et al. | 714/755 |
| 4,788,685 | 11/1988 | Sako et al. | 714/761 |
| 4,949,342 | 8/1990 | Shimbo et al. | 714/763 |
| 5,475,669 | 12/1995 | Yamamoto | 369/58 |
| 5,638,386 | 6/1997 | Tsumoda et al. | 714/769 |

FOREIGN PATENT DOCUMENTS

| | | |
|---|---|---|
| 0 729151A 2 | 8/1996 | European Pat. Off. . |
| 0 785551 A2 | 7/1997 | European Pat. Off. . |
| 2 714 498 | 6/1995 | France . |

Primary Examiner—Trinh L. Tu
Attorney, Agent, or Firm—R. William Beard, Jr.; Frohwitter

[57] ABSTRACT

A quick retry operation is possible by outputting an error flag pertaining to a sector after error correction processing of digital data. When an output of an error detection flag unit for a correction block indicates the existence of an uncorrectable error, the sectors are checked to see if the sectors corresponding to retrieved data include any error or not based on output from a sector error flag register B. When the sectors are judged as error, signals are retrieved again from a storage medium, restored in a memory, and an error correction processing is repeated again. The data such as that of P pictures or B pictures of MPEG which can be reproduced even with errors are output even when the error detection flag unit indicates the existence of the uncorrectable error. It enables identification of the sectors with the errors and simplifies the following operations pertaining to the error at a data receiving side by outputting the error flag along with the data.

3 Claims, 4 Drawing Sheets

6,014,766

DIGITAL SIGNAL REPRODUCTION APPARATUS

CONTINUATION STATEMENT

This application is a continuation of U.S. patent application Ser. No. 09/008,906 filed on Jan. 16, 1998, still pending.

BACKGROUND OF THE INVENTION

MPEG compression processing of picture data is one method for recording high quality pictures for a long period of time by which the picture data are recorded on a storage medium such as an optical disk or a magnetic tape. A detailed explanation of MPEG is given in "Saishin MPEG Kyokasho (The Newest MPEG Textbook)" supervised by Hiroshi Fujiwara, published Aug. 1, 1994 by ASCII Publishing Company in Japan.

First, picture signals are encoded to MPEG signals when a recording operation using MPEG is executed. Data of the MPEG signal are evenly divided every n-byte (n: a natural number), and m-byte (m: zero or a positive integer) accessory data is added to the data to constitute a single sector. Further, p (p: a natural number) of the sectors, and the first and second error correction codes comprise a correction block. Digital signal processing such as modulation processing is applied on such a correction block so as to record the data of the correction block in a storage medium such as an optical disk or a magnetic tape.

Reversing the recording operation enables reproduction of the picture signals recorded as above in the storage medium. The MPEG signal is reproduced by applying demodulation processing and error correction processing on the data read from the storage medium, and stored in a transfer rate control buffer. The transfer rate control buffer outputs specified data among the stored data to a MPEG decoder according to a data transfer rate of output to the MPEG decoder. The MPEG decoder decodes the MPEG signal to a picture signal, and outputs the picture signal decoded.

The error correction processing is applied on the reproduced data, which has been stored in an error correction process buffer, using the error correction code recorded with data in the storage medium. The data is handled in single sector units at a time while the error correction processing is executed with a unit of single correction block so as to increase a code length in light of increasing error correction performance and decreasing the degree of code redundancy.

The data of each correction block are arrayed two-dimensionally. The second error correction code C2 is obtained through a calculation carried out along the vertical direction of the two-dimensional data array. The second error correction code C2 is then added to the end of the column calculated. Next, the first error correction code C1 is obtained through a calculation in the horizontal direction, and added to the end of the row calculated. When reproducing the data, the error correction processing using the first error correction code C1 is conducted first, then the second error correction processing using the second error correction code C2 is conducted. A variable transfer rate is employed in data output from a digital signal process circuit to the MPEG decoder since the degree of compression in the MPEG compression processing is different for a complex picture and a simple picture, while the output transfer rate from the MPEG decoder is constant. It is technically easier to use a constant transfer rate for retrieving data from a storage medium such as an optical disk or a magnetic tape to the digital signal process circuit, and rather difficult to adjust the readout transfer rate in conformity with the data output transfer rate to the MPEG decoder.

Accordingly, the readout transfer rate from the optical disk is fixed to a constant value, and the transfer rate, which precedes output of the data processed by the error correction processing to the MPEG decoder, is adjusted using the transfer rate control buffer.

Realizing both the error correction process buffer and the transfer rate control buffer by a single common buffer, there are various advantages such as saving of buffer capacity and eliminating the need for data transfer from the error correction process buffer to the transfer rate control buffer.

A flag only indicating the existence of errors in the row is generated when the data retrieved from the storage medium contain more errors than the upper limit of the errors under which the errors are correctable using the first error correction code. Then the second error correction processing is executed using the flag and the second error correction code.

Error become uncorrectable when there are errors, which are beyond an error correction ability of the second error correction processing even after the second error correction processing, in the data processed by the first error correction processing. In this case the error correction processing is terminated with the errors still existing in the correction block composed of a plurality of the sectors. Conventionally, when the block having the uncorrectable error is detected, the error correction processing has to be repeated. The data in all the sectors of the correction block having the uncorrectable error has to be retrieved again from the storage medium, even if only some of the sectors in the correction block are required for reproducing a picture and some of the sectors required include no error, since the error correction processing is executed in units of the correction block in the prior art. This is called a retry operation.

Further, when the error flag is output during the data output processing and the retry operation is carried out in response to the error flag, the retry operation may lower a substantial transfer rate during the data output.

SUMMARY OF THE INVENTION

The object of the present invention is to provide a digital signal reproduction apparatus enabling a quick retry operation.

The object of the present invention is accomplished by a digital signal reproduction apparatus for reproducing a digital signal from data recorded in a storage medium, wherein the data recorded in the storage medium is constructed by dividing data of the digital signal every n-byte (n: a natural number), adding m-byte (m: a natural number) of accessory data to each of the n-byte data to constitute a sector, and composing a correction block from data of p (p: a natural number) sectors by adding the first error correction codes and the second error correction codes, comprising: retrieval means for retrieving the data recorded from the storage medium; temporary memory means for storing both data retrieved and data processed by an error correction processing; error correction means for applying the first error correction processing to the correction block (=p sectors) using the first error correction code, the data of the correction block being retrieved and stored in the temporary memory means, and applying the second error correction processing to said correction block using the second error correction code; readout means for reading out the data which are processed with the error correction means and stored in the temporary memory means; and generation means for generating a sector error flag indicating a sector having uncorrectable errors according to results of the first and second error correction processing.

Alternatively, the digital signal reproduction apparatus may further comprise the first flag storing means for storing the sector error flags, which are generated by the generation means, pertaining to all the sectors of the data which are processed by the error correction means and stored in the temporary memory means.

The digital signal reproduction apparatus may further comprise means for outputting the error flag which is stored in the first flag storing means and corresponds to source data of the digital signal to be output during output of the digital signal by the output process means.

The digital signal reproduction apparatus may further comprise the second flag storing means for storing the sector error flags generated by the generation means pertaining to p sectors in a correction block every time completing the first and second error correction processing on data of the correction block stored in the temporary memory means The digital signal reproduction apparatus may further comprise block-uncorrectable signal generation means for outputting a notification signal for notifying the existence of a sector having an uncorrectable error in the correction block which was processed by the error correction means if any sector error flags are stored in the second flag storing means.

The digital signal reproduction apparatus may further comprise control means having a retry function for enabling retrieval of data for the correction block which can be identified with the notification signal by retrieving the data again from the storage medium, applying the error correction processing on the data retrieved, and re-storing the error-corrected data in the temporary memory means.

The control means may further have a no-retry function enabling readout of the data of the correction block which are designated with the notification signal as they are by the readout means, and a judgment function for making a decision as to whether to execute the retry operation or not, and selectively activates one of the retry function and the no-retry function according to the decision of the judgment means.

According to the present invention with the configuration described above, it is possible to generate and output the error flag pertaining to each of the sectors in the error correction processing.

The generation of the error flag pertaining to each of the sectors makes it possible to judge whether the sector with the error is the sector to be output or whether it is data in which the error is permissible. For example, it is possible to conduct the output processing on data without conducting the retry operation when the data is of the sector with the error but not for output, or when the data is for output but reproducible even with errors like the P picture or the B picture of an MPEG signal. Thus the output processing may be executed quickly.

Further, it is possible to notify a following apparatus about the error sector by outputting the error flag pertaining to the error sector along with a digital signal based on the error sector. Having notified about the error sector, it is possible to simplify operations against the data error at the downstream apparatus.

DESCRIPTION OF THE PREFERRED EMBODIMENTS

The first embodiment of the present invention will now be explained. Here, it is discussed that a digital signal processing portion in which data retrieved from a disk are accepted, and an error correction processing is applied on the data, and then the data corrected are output to a MPEG decoder or a computer.

Figure 1:
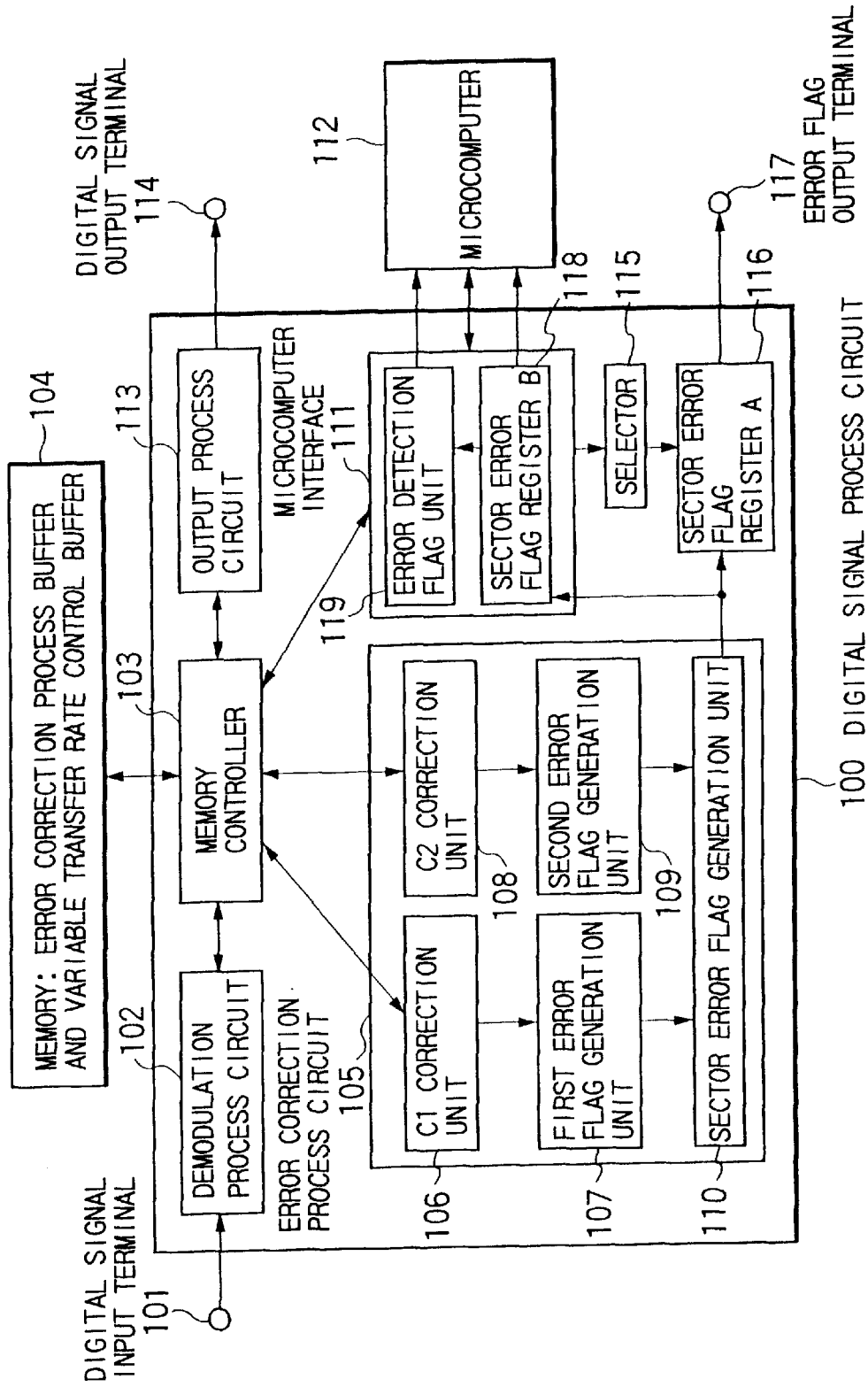
FIG. 1 is a block diagram showing a part of the configuration of a digital signal reproduction apparatus of the present invention, which carries out the digital signal processing.

FIG. 1 is a block diagram illustrating a part of the configuration conducting the digital signal processing in an embodiment of a digital signal reproduction apparatus on which the present invention is applied.

In FIG. 1, 100 is the digital signal process circuit, 101 is a digital signal input terminal, 102 is a demodulation process circuit, 103 is a memory controller, 104 is a memory functioning as both an error correction buffer and a data transfer control buffer, 105 is an error correction process circuit, 106 is a C1 correction unit, 107 is a C1 flag generation unit, 108 is a C2 correction unit, 109 is a C2 flag generation unit, and 110 is a sector error flag generation unit.

Further in FIG. 1, 111 is a microcomputer interface, 112 is a microcomputer functioning as a system controller, 113 is an output process circuit, 114 is a digital signal output terminal, 115 is a sector error flag selector, 116 is a sector error flag register A, 117 is a sector error flag output terminal, 118 is a sector error flag register B, and 119 is an error detection flag unit pertaining to each of the error blocks.

Figure 2:
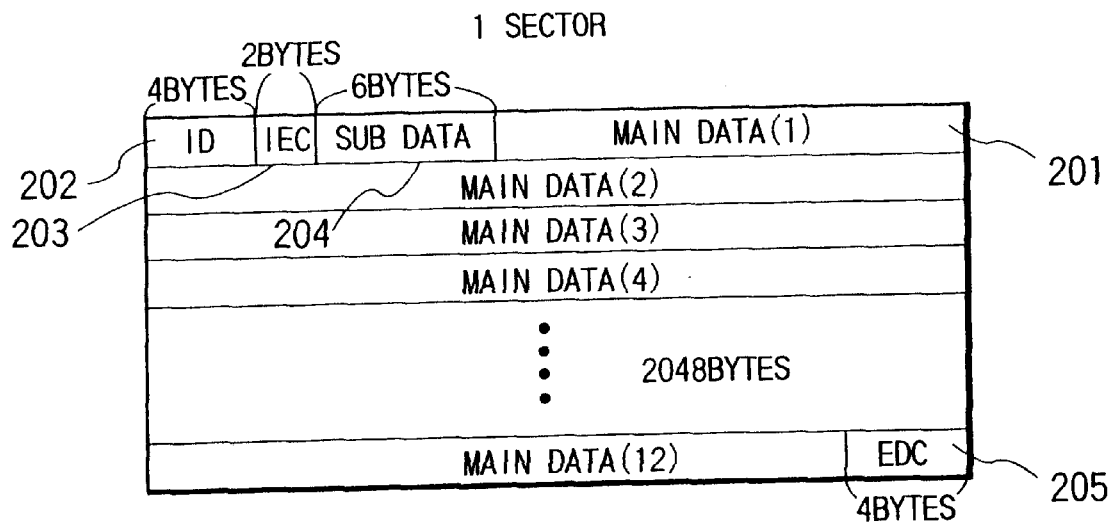
FIG. 2 is a sector format diagram, which is one format diagram according to a recording method in an embodiment of the present invention.

FIG. 2 shows a format of the sector which forms a unit during the data output operation. 201 is main data which are divided into blocks each consisting of 2048 byte data, 202 is an ID which is a four byte identification number for distinguishing the sector corresponding to the main data, 203 is an IEC which is an error correction code of the ID, 204 is sub-data which are accessory information of the main data, and 205 is an EDC which is an error correction code of the sector. Units indicated by 201, 202, 203, 204 and 205 comprise each of the sectors.

Figure 3:
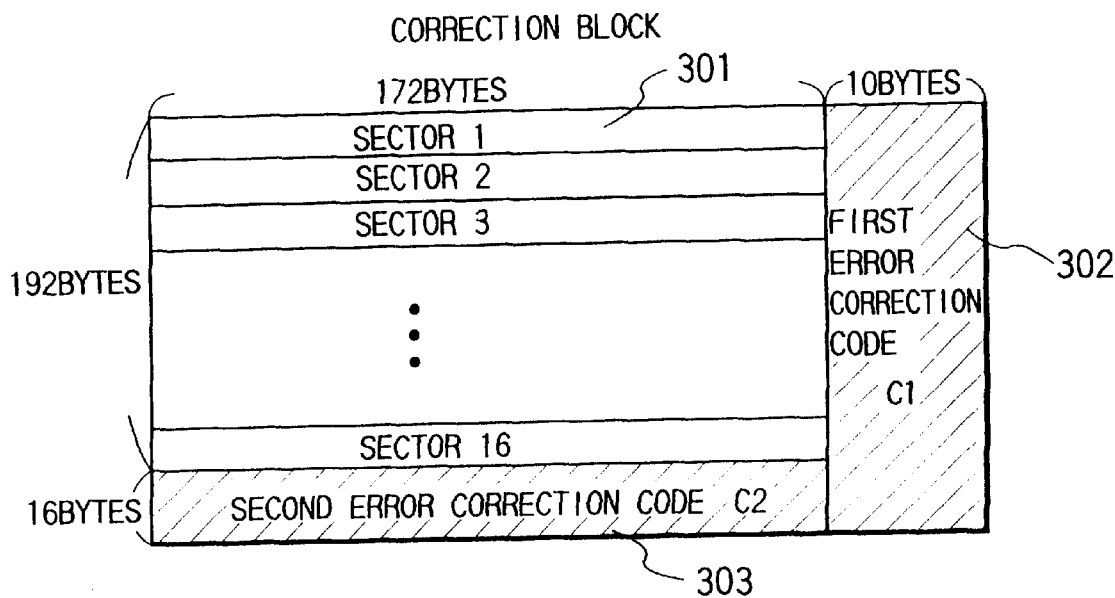
FIG. 3 is a correction block format diagram, which is one format diagram according to a recording method in an embodiment of the present invention.

The data output is carried out single sector units, while 16 sectors comprise the correction block so as to increase a code length in light of promoting error correction performance and lowering the degree of code redundancy. FIG. 3 shows a format of the error correction block, and 301 is one of the sectors. The sectors are arrayed two-dimensionally, and every second error correction code C2 is obtained through a calculation carried out along the vertical direction of the two-dimensional data array. 303 indicates an area in which the second error correction codes C2 calculated are disposed. Next, the first error correction code C1 is obtained through a calculation carried out along the horizontal direction. 302 indicates an area in which the first error correction codes calculated are disposed. The error block is composed of 16 sectors and these codes C1 andC2.

A variable transfer rate is employed in the data output from the digital signal process circuit to the MPEG decoder since the degree of compression in the MPEG compression processing is different in a picture whose content is complex and one whose content is simple. It is technically easier to use a constant transfer rate for retrieving data from the storage medium such as an optical disk or a magnetic tape for the digital signal process circuit, and rather difficult to adjust the retrieval transfer rate in conformity with the data output transfer rate to the MPEG decoder.

Thus the retrieval transfer rate from the optical disk is fixed at a constant value in the present embodiment, and the transfer rate is adjusted using the transfer rate control buffer before the output of data which are error corrected to the MPEG decoder. Further in the present embodiment, it is possible to save a buffer capacity and reduce a load of the data transfer operation by realizing both the error correction process buffer and the transfer rate control buffer with a common buffer.

Figure 4:
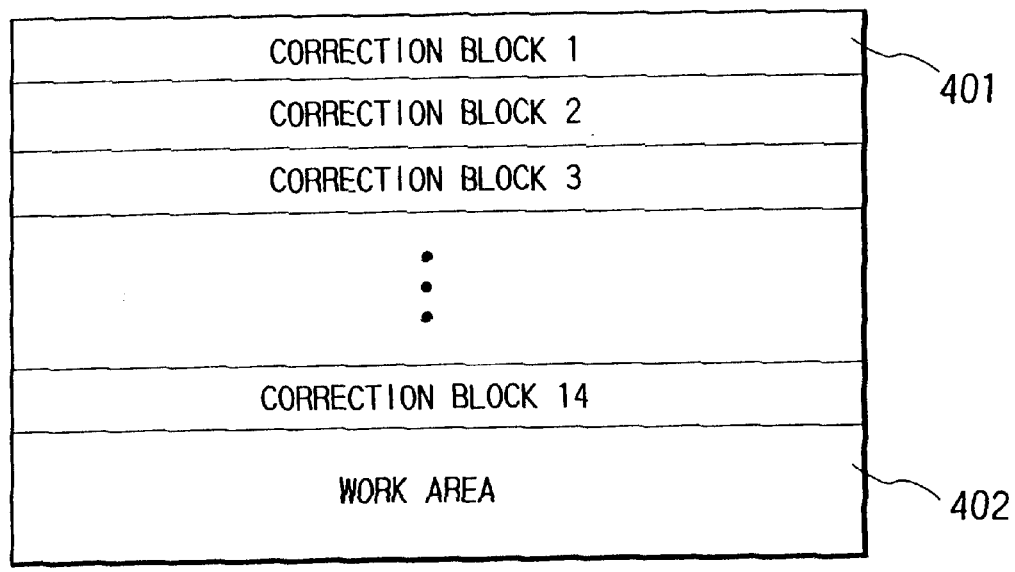
FIG. 4 is a memory map diagram, which is one format diagram according to a recording method in an embodiment of the present invention.

FIG. 4 shows a memory map of the memory 104 wherein the error correction process buffer and the variable transfer rate control buffer are constructed. 401 is a storage area of the correction block. Fourteen correction block storage areas 401 are provided in the memory 104 as the rate transfer control buffer and the error correction process buffer enabling the variable transfer rate operation. According to this structure, data may be continuously output even during an access operation to the disk. Further, the memory 104 is provided with a work area 402 functioning as a control signal buffer of MPEG data. The number of correction block storage areas 401 in the memory 104 is not necessarily limited to 14 and may be set to any other number.

As shown in FIG. 1, a digital signal input via the digital signal input terminal 101 is provided to the demodulation process circuit 102. The demodulation process circuit 102 executes a demodulation process on the digital signal provided. The demodulated signal is stored in the memory 104 via the memory controller 103. The digital signal stored in the memory 104 is sent to the error correction process circuit 105 via the memory controller 103 for being processed with the error correction processing.

The error correction processing is executed in the following manner. First, the C1 correction unit 106 executes the first correction processing using the first error correction code C1, and the first error flag generation unit 107 sets up the first error flag for each of the sectors having the uncorrectable error. Next, the C2 correction unit 108 executes the second correction processing using the second error correction code C2, and the second error flag generation unit 109 sets up the second error flag when there is a column having the uncorrectable error. The sector error flag generation unit 110 generates an error flag pertaining to each of the sectors, i.e. the sector error flag, based on the status of the first and second error flags.

Concretely, the sector error flag is setup for such a sector that includes a data line composed of a unit of horizontal 182 byte data, having the error uncorrectable by the first correction processing, and to which the first correction error flag is setup, when there is a data column composed of a unit of vertical 208 byte data, including the error uncorrectable by the second correction processing.

All the sector error flags corresponding to the data processed with the error correction processing are stored in the sector error flag register A 116 while the pertaining data are kept in the transfer rate buffer. A buffer for storing the error flags requires only a small capacity even if the error flags for all the data stored in the transfer rate control buffer were to be stored since the error flag is generated by a unit of the sector.

The sector error flags corresponding to the correction block data which has just finished the error correction processing are also provided to the sector error flag register B 118 of the microcomputer interface 111. When the sector error flag is present, the error detection flag unit 119 being operated with a unit of the correction block outputs a flag or its information indicating the uncorrectable error to the microcomputer 112. Alternatively, the microcomputer 112 may access the error detection flag unit 119 for checking the flag status instead of accepting the flag or information regarding the flag.

The data processed with the error correction processing in the memory 104 is transferred to the output process circuit 113 via the memory controller 103, and sent to outside after being processed in the output process circuit 113. This output data is data designated by the microcomputer 112. In parallel to the data output, the sector error flag selector 115 selects the sector error flags corresponding to the output data from the content of the sector error flag register A 116, and externally outputs those sector error flags. Alternatively, information regarding the flag may be output instead of the flag from the sector error flag register A 116, or the apparatus outside may access to the sector error flag register A 116 for checking the flag status.

The demodulation processing, the error correction processing and the output processing mentioned above are executed concurrently. The error correction processing is executed with a unit of the correction block. To realizing the variable transfer rate, the digital signal process circuit 100 is provided with many of the correction block areas 401 in the transfer rate control buffer, and executes the output processing only after an ample amount of the corrected data have been stored in these areas 401. According to this, the data may be output continuously with the variable transfer rate.

An increase of time up to the data output may be prevented by taking a quick retry operation in the microcomputer 112 based on the output signal from the sector error flag register B 118 in parallel to the storing operation of the error corrected data in the memory 104 after the error correction processing in the digital signal process circuit 100. An explanation of this will now be presented in the following.

If a flag indicating the uncorrectable error is setup by the error detection flag unit 119 which operates with a unit of the correction block after the first and second processing, the microcomputer 112 receives the flag data indicating the uncorrectable error, and then detects the sector with the uncorrectable error by checking the sector error flag register B 118. If no error is detected in the sectors to be output, the sectors may be output as they are. If there are any errors in the sectors to be output, the retry operation is carried out, or the correction processing may be repeated instead of the retry operation.

A sufficient number of the correction blocks to be output with their errors being corrected are stored in the memory 104 during a period from the error correction processing to the output process since the error correction buffer and the transfer rate control buffer are provided for storing 14 sets of the error block data. Thus the data output will not be delayed unless the retry operation is repeated several times.

The second embodiment of the present invention will now be described. For the signal process circuits in the present embodiment, a block diagram showing a hardware construction and names are the same as that of the first embodiment of FIG. 1. Further, a series of information signal flow, recording formats and a memory map are the same as that of the first embodiment. Processes different from the first embodiment are described hereafter.

In the present invention, the retry operation or repeating of the error correction processing may be executed in a normal operation mode when the error is detected after the first error correction processing using the code C1 and the second error correction processing using the code C2, and the sector having the error is requested to be output. However, the retry operation is not executed and the data including the error is output as it is if content of the output data is a signal such as a P (Predictive) picture or a B (Bidirectionally predictive) picture of the MPEG signal, which may be reproducible even it has some errors within it, since the object of the present invention is to prevent a decrease in the output transfer rate.

The microcomputer 112 judges if the sector corresponds to the data read out has the uncorrectable error or not based on information stored in the sector error flag register B when the error detection flag unit 119 has indicated the uncorrectable error. Further, the microcomputer 112 is provided with the first function for repeating a retrieval operation of a signal from the storage medium to re-store in the memory 104 and re-executing the error correction processing 105 when the data error is judged as uncorrectable, the second function for controlling the output process circuit 113 to output the data even when the error detection flag unit 119 indicates the existence of an uncorrectable error, and the third function for selecting either the first function or the second function.

During the data output, the sector error flag selector 115 selects the sector error flag corresponding to the output data, and the sector error flag corresponding to the output data is output together with the output data using the sector error flag register A 116. It enables identification of the sector having the error and simplifies the following processes pertaining to the error in a downstream apparatus, i.e. the MPEG decoder.

However, the retry operation or the repeating of the correction processing may be executed if the data with the error are of a signal such as a I (Intra) picture of the MPEG signal or computer data in which 1 bit of data may cause a serious effect.

Figure 5:
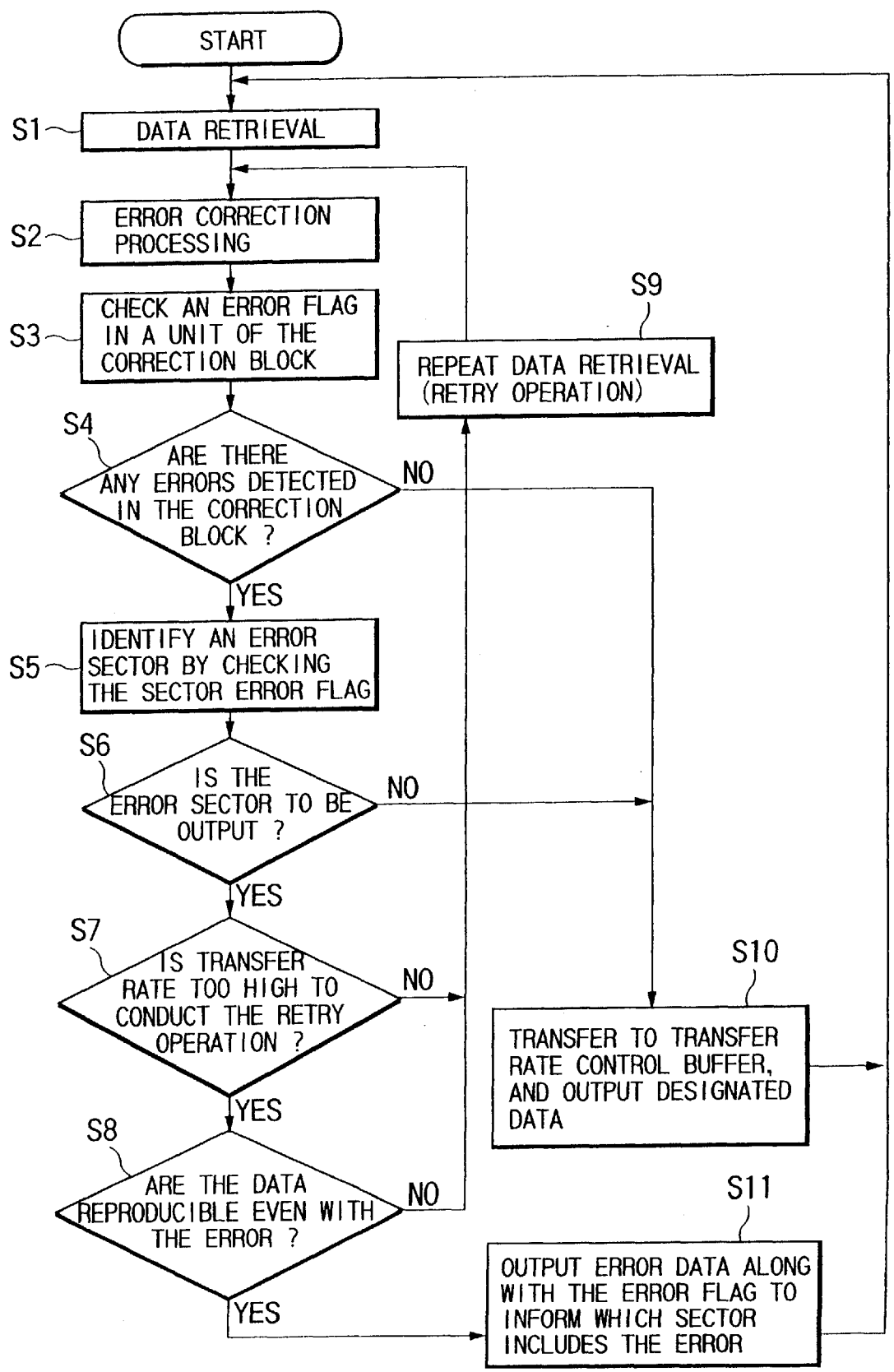
FIG. 5 is a flowchart showing a reproduction operation according to the present invention.

The reproduction processing may be varied depending on the content of the data reproduced because there is enough time from the error correction processing to the output processing of the correction block. FIG. 5 shows a flowchart indicating the data reproduction processing in the second embodiment of the present invention described above.

As shown in FIG. 5, first in the present embodiment, data are retrieved from the storage medium (S1), and the error correction processing described above is applied to the data retrieved. The error flag for the correction block is checked (S4). When there is an error flag, the sector error flag is further checked and the sector having the error is identified (S5). Then, it is checked if the sector having the error is one of the sectors to be output (S6). When the sector having the error is requested to be output, it is further checked if an output transfer rate requested is too high to allow execution of a retry operation. When the output transfer rate is too high, the data are checked to see if it can be reproduced even with the error. When it is possible for the data to be reproduced even with the error, the data are transferred to the transfer rate control buffer for output. Then the steps from S1 are repeated.

When there is no error in the correction block retrieved (no in S4), or when the sector with the error is not requested to be output (no in S6), the data of the correction block are transferred to the transfer rate control buffer, and designated data of the correction block is output (S10). Then the steps from S1 are repeated.

When there is enough time to execute the retry operation regarding the correction block retrieved (no in S7), or when it is not possible to reproduce the correction block because of the error in its content (no is S8), the data of the same correction block are retrieved again (S9) and the steps from S2 are repeated (the retry operation).

Administration of the control operations described above and an decision operation regarding an execution of the retry operation are conducted by the microcomputer 112. The microcomputer 112 recognizes a type (I, P, B) of coding applied on data of each sector and a time required to execute the retry operation. Further, the microcomputer 112 accepts setup information for designating either a speed-priority mode or a reliability-priority mode for the present system from a user. When the speed-priority mode is designated, the retry operation is executed in the S7 only if the time till the start of the output processing of the correction block to be output is longer than the time required to execute the retry operation. Alternatively, the execution of the retry operation may be decided simply based on a number of retry operations repeated for the same correction block or a lapse of time from the first time execution of the error correction processing with the correction block.

What is claimed is:

1. A digital signal reproducing method for reproducing a digital signal from data recorded on a storage medium, wherein, said storage medium comprises at least one correction block for storing the recorded data;

said at least one correction block comprises a plurality of sectors in which the recorded data is stored, a plurality of first error correction codes, and a plurality of second error correction codes; and each sector of said plurality of sectors constitutes a predetermined number of bytes of data, said digital signal reproducing method comprising:

identifying a sector as having an error by reading said recorded data within said at least one correction block from said storage medium and detecting an error by performing first and second error correction processes on said read data; and performing at least any one of the following steps in accordance with the result of said identifying a sector as having an error, retrying reading the recorded data within said at least one correction block including the identified sector having an error, outputting, from a correction block with the identified sector having an error, recorded data from at least one sector other than the identified sector having an error; and outputting recorded data from at least one sector within the correction block whether the correction block including the identified sector has error or not.

2. A digital signal reproducing method in accordance with claim 1, further comprising:

generating a sector error flag which indicates a sector including said recorded data that has been identified as having an error by said first error correction process and said second error correction process.

3. A digital signal reproducing method in accordance with claim 2, further comprising:

notifying that in the correction block on which the first error correction process and the second error correction process have been performed, there exists a sector the error of which has failed to be corrected, in the case where said sector error flag is generated for said sector.

* * * * *